United States Patent
Caulfield et al.

(10) Patent No.: US 10,579,389 B2
(45) Date of Patent: Mar. 3, 2020

(54) FUSION OF INSTRUCTIONS BY DELAYING HANDLING OF A PARTIAL SUBSET OF A FUSIBLE GROUP OF INSTRUCTIONS

(71) Applicant: ARM Limited, Cambridge (GB)

(72) Inventors: Ian Michael Caulfield, Cambridge (GB); Chiloda Ashan Senerath Pathirane, Cambridge (GB)

(73) Assignee: ARM Limited, Cambridge (GB)

( * ) Notice: Subject to any disclaimer, the term of this patent is extended or adjusted under 35 U.S.C. 154(b) by 299 days.

(21) Appl. No.: 14/929,904

(22) Filed: Nov. 2, 2015

(65) Prior Publication Data

US 2017/0123808 A1  May 4, 2017

(51) Int. Cl.
*G06F 9/38* (2018.01)
*G06F 9/30* (2018.01)

(52) U.S. Cl.
CPC .......... *G06F 9/3853* (2013.01); *G06F 9/3017* (2013.01); *G06F 9/3802* (2013.01); *G06F 9/3836* (2013.01)

(58) Field of Classification Search
CPC ... G06F 9/3853; G06F 9/30181; G06F 9/3887
See application file for complete search history.

(56) References Cited

U.S. PATENT DOCUMENTS

| | | | | |
|---|---|---|---|---|
| 6,889,318 B1* | 5/2005 | Wichman | ............ | G06F 9/3853 712/226 |
| 2004/0034757 A1* | 2/2004 | Gochman | .......... | G06F 9/30145 711/219 |
| 2009/0220071 A1* | 9/2009 | Gueron | ................. | G06F 21/75 380/28 |
| 2010/0115248 A1* | 5/2010 | Ouziel | ................. | G06F 9/3016 712/226 |
| 2010/0299505 A1* | 11/2010 | Uesugi | ................. | G06F 9/3017 712/221 |
| 2013/0097409 A1* | 4/2013 | Yamana | ................... | G06F 9/30 712/219 |
| 2014/0281397 A1* | 9/2014 | Loktyukhin | ........ | G06F 9/30029 712/208 |
| 2016/0139928 A1* | 5/2016 | Gschwind | .............. | G06F 9/382 712/220 |
| 2016/0313997 A1* | 10/2016 | Gschwind | ............. | G06F 9/3017 |

OTHER PUBLICATIONS

R. Rakvic, J. González, Q. Cai, P. Chaparro, G. Magklis, A. Gonzalez, "Energy efficiency via thread fusion and value reuse", IET Computers Digital Techn., vol. 4, No. 2, pp. 114-125, 2010.*

* cited by examiner

*Primary Examiner* — John M Lindlof
(74) *Attorney, Agent, or Firm* — Nixon & Vanderhye P.C.

(57) ABSTRACT

An apparatus includes a processing pipeline comprising a plurality of stages, the plurality of stages including at least one instruction fusing stage to detect whether a block of instructions to be processed comprises a fusible group of instructions, and to generate a fused instruction to be processed by a subsequent stage of the processing pipeline when said block of instructions comprises said fusible group. However, when said block of instructions comprises a partial subset of said fusible group of instructions, the instruction fusing stage is configured to delay handling of said partial subset of said fusible group of instructions until the instruction fusing stage has determined whether at least one subsequent block of instructions to be processed comprises a remaining subset of instructions of said fusible group.

18 Claims, 9 Drawing Sheets

|   | Execute 1 | Execute 2 | Execute 3 |
|---|---|---|---|
| 1 | AESEMC | | |
| 2 | | AESEMC | |
| 3 | | | AESEMC |
| 4 | | | |
| 5 | | | |
| 6 | | | |

FUSION OF INSTRUCTIONS BY DELAYING HANDLING OF A PARTIAL SUBSET OF A FUSIBLE GROUP OF INSTRUCTIONS

BACKGROUND

Technical Field

The present technique relates to the field of data processing. More particularly, it relates to instruction fusion.

Technical Background

Some processing pipelines may have hardware that supports fusing two or more separate instructions into a single fused instruction to be processed by subsequent stages of the pipeline.

SUMMARY

At least some examples provide an apparatus comprising:

a processing pipeline comprising a plurality of stages;

the plurality of stages comprising at least one instruction fusing stage to detect whether a block of instructions to be processed comprises a fusible group of instructions, and to generate a fused instruction to be processed by a subsequent stage of the processing pipeline when said block of instructions comprises said fusible group;

wherein when said block of instructions comprises a partial subset of said fusible group of instructions, the instruction fusing stage is configured to delay handling of said partial subset of said fusible group of instructions until the instruction fusing stage has determined whether at least one subsequent block of instructions to be processed comprises a remaining subset of instructions of said fusible group.

At least some examples provide an apparatus comprising:

a plurality of means for performing a stage of pipelined processing;

at least one of said means for performing a stage of pipelined processing comprising means for detecting whether a block of instructions to be processed comprises a fusible group of instructions, and when said block of instructions comprises said fusible group generating a fused instruction to be processed by a subsequent means for performing a stage of pipelined processing;

wherein when said block of instructions comprises a partial subset of said fusible group of instructions, said at least one of said means for performing a stage of pipelined processing is configured to delay handling of said partial subset of said fusible group of instructions until the means for detecting has determined whether at least one subsequent block of instructions to be processed comprises a remaining subset of instructions of said fusible group.

At least some examples provide a method comprising:

detecting at an instruction fusing stage of the processing pipeline whether a block of instructions to be processed comprises a fusible group of instructions, and generating a fused instruction to be processed by a subsequent stage of the processing pipeline when said block of instructions comprises said fusible group; and when said block of instructions comprises a partial subset of said fusible group of instructions, delaying handling of said partial subset of said fusible group of instructions at said instruction fusing stage until it is determined whether at least one subsequent block of instructions to be processed comprises a remaining subset of instructions of said fusible group Further aspects, features and advantages of the present technique will be apparent from the following description of examples, which is to be read in conjunction with the accompanying drawings.

DESCRIPTION OF EXAMPLES

Some specific examples will be discussed below. It will be appreciated that the invention is not limited to these particular examples.

Some processing pipelines may support fusion of instructions. When a fusible group of instructions is encountered, it may be more efficient to process these as a fused instruction. For example, it may take a larger number of processing cycles to process each instruction of a group of fusible instructions individually than it would to process a fused instruction which provides an equivalent function, so fusion can allow not only the fusible group of instructions themselves to be processed faster, but also make more pipeline resource available for other instructions to improve performance for the other instructions as well.

Accordingly, some pipelines may include an instruction fusing stage for fusing such groups of instructions. When a suitable group of fusible instructions are available at the instruction fusing stage, they may then be fused into the fused instruction. However, this typically requires all instructions from the fusible group of instructions to be available for consideration by the instruction fusing stage at the same time. However, sometimes a fusible group of instructions may be split across multiple blocks of instructions considered in successive cycles by the pipeline. In this case, instruction fusion would not typically be possible.

The present technique recognises that in situations where only a partial subset of the group of fusible instructions is available in the block of instructions being considered by the instruction fusing stage, and the remaining subset of the group becomes available at a later point, it may still be beneficial to generate a fused instruction. By delaying handling of the partial subset of the fusible group until the instruction fusing stage has determined whether a subsequent block of instructions to be processed includes the remaining subset of the fusible group, this allows instructions to be fused even when the fusible group is split across multiple blocks. Hence, should the remaining subset of the group become available, the fused instruction may then be generated. The efficiency gains provided by generating this fused instruction can outweigh the cost incurred by delaying the partial subset of the group.

This is surprising since delaying handling of the partial subset of instructions risks degrading performance since if the remaining subset of the fusible group never arrives then the partial subset has been delayed for no benefit. One would expect that since the benefit of fusion is only a potential benefit (the remaining subset may never arrive or may not arrive for a long time), it would generally be better to continue handling the partial subset as individual instructions and restrict fusion to the case when the whole fusible group is available in the same block of instructions being considered by the instruction fusing stage.

However, the inventors recognised that there are some fusible groups of instructions which in practice are often used together by programmers so that when a partial subset of the fusible group is encountered, it is relatively likely that the remaining subset of the fusible group will follow in a subsequent block. Also, for such fusible groups often the benefit of fusing the fusible group and processing a fused instruction instead may be much greater than just a few cycles and this may outweigh the cost of delaying the partial subset for a few cycles to allow fusion with the remaining subset.

When the subsequent block of instructions comprises the remaining subset of the group of fusible instructions, the instruction fusing stage may generate the fused instruction. Therefore, the efficiency gains provided by the fused instruction may still be provided even when the subsets of the fusible group are temporally separated relative to a point at which the instruction fusing stage considers the instructions, or spread across multiple blocks of instructions considered separately.

If the instruction fusion stage delays further processing of a partial subset of the fusible group, and then the remaining subset of the fusible group does not arrive within a predetermined period, it may be efficient to stop the delay and select the partial subset of the fusible group for further processing by a subsequent stage of the pipeline. Since the efficiency gains in terms of processing cycles provided by the fused instruction diminishes as the delay to the partial subset increases, a delay larger than a predetermined period can decrease efficiency. Therefore, providing an effective cut off point can improve the efficiency of the processing pipeline.

The predetermined period may be measured in terms of blocks of instructions processed by the instruction fusing stage. If the remaining subset of fusible instructions is not encountered in a predetermined number of subsequent blocks of instructions to be processed, the partial subset of the group can be processed individually without fusion.

The predetermined period may also be measured in terms of time. If the remaining subset of fusible instructions does not become available within a predetermined period of time, further processing of the partial subset of the group will continue based on the individual instructions without fusion.

The instruction fusing stage may be configured to determine whether to delay handling of a partial subset of a fusible group based on the monitoring of previous instructions. This allows delaying of the partial subset of the fusible group to allow potential fusion with remaining subset to be restricted to cases where monitoring of previous instructions have found the delay to be beneficial. For example, if it has been found that during recent processing, a partial subset of a group of fusible instructions is rarely followed by the remaining subset of the fusible group, then the next time a partial subset of this group arrives it may be sent directly for further processing without causing a delay.

In some cases the pipeline may support a plurality of fusible groups of instructions, each group having a different corresponding fused instruction. For some fusible groups, it may be relatively unlikely that the remaining subset will follow soon after the partial subset, in which case delaying handling of the partial subset may not be beneficial. For such groups, while fusion may be performed when all of the fusible group is present in the same block, if only a partial subset is encountered within a block being considered then the partial subset would not be delayed.

For other groups, it may be more likely that the partial subset will be followed by the remaining subset within a relatively small time frame, or the performance benefit of fusion may be greater so that a longer delay in handling the partial subset can be tolerated. Therefore, it may be beneficial to delay the partial subset for these fusible groups to allow potential fusion with the remaining subset.

Hence, the instruction fusing stage may monitor occurrences of each fusible group and separately decide whether to delay the partial subset for a first group of fusible instructions and a second fusible group. Hence, the delay need not be carried out for all groups of instructions that are capable of being fused.

A counter may be used for the monitoring of instructions in order to predict whether or not to delay future subsets of the fusible group. For example, a counter can be incremented each time a partial subset of the group of fusible instructions is followed by the remaining subset within a predetermined period, and the count value may then be compared against a threshold value when determining whether or not to delay a partial subset of the fusible group that is subsequently received. Hence, the odd occasion when fusion would have been beneficial does not necessarily trigger delaying the partial subset of that fusible group in future, but if more than a certain number of occasions are detected when the remaining subset followed soon after, then the partial subset would be delayed in future.

Similarly, the monitoring of instructions may also decrement the counter each time a partial subset of the fusible group is not followed by the remaining subset in the predetermined period. Hence, the count value may reflect the previous success rate of generating a fused instruction when the group of fusible instructions are not initially available in the same block of instructions.

Separate count values can be maintained for different fusible groups to track whether to delay separately for each group.

In this context, the terms "increment" and "decrement" may refer to opposite adjustments to the counter by a certain amount. While often incrementing the counter may comprise adding a certain amount to the counter and decrementing the counter may comprise subtracting that amount from the counter, in other cases the increment and decrement could correspond to negative and positive adjustments respectively (i.e. the increment amount could be negative). Also, it is not essential for the increment and decrement to adjust the counter value by the same amount—in some cases the system could be biased towards delaying or not delaying the partial subset of the fusible group by making one of the increment and decrement amounts greater than the other.

The result of executing the fused instruction may be functionally equivalent to the result of executing each instruction of the fusible group individually. The outcome of the fused instruction may be the same as the outcome of executing each instruction of the fusible group in succession.

The fused instruction may also require fewer processing cycles to execute than the group of fusible instructions.

In some cases, while delaying the partial subset of the fusible group, the instruction fusing stage may stall handling of instructions (e.g. stall instruction decoding or issuing to await the next group). For example, this may be appropriate if the pipeline is processing a single thread of instructions where subsequent instructions are dependent on the fusible group of instructions.

However, in other cases while handling of the partial subset of the fusible group is delayed, the instruction fusing stage may handle an instruction whose outcome is independent of the outcome of the partial subset of the fusible group in the meantime. Therefore, the instruction fusing stage is not idle whilst waiting for the remaining subset of the group of fusible instructions to be available, and other instructions may be processed sooner than if they had been processed after the partial subset of instructions, so the overall performance for the stream of instructions as a whole may not be significantly lower even if the remaining subset of the fusible group never arrives. Hence, this approach allows the cost of delaying handling of the partial subset of the group of fusible instructions to be reduced. This approach is particularly useful in an out-of-order pipeline which supports processing of instructions in a different order to the order in which the instructions are fetched from an instruction cache or memory.

The present technique is particularly useful for simultaneous multi-threading (SMT) processing environments where instructions from different threads may be pending in the pipeline simultaneously. This is because the outcome of instructions of a different thread will generally be independent of the outcome of the partial subset of the group of fusible instructions. Therefore, often the instruction fusing stage will have an independent instruction from a different thread that can be processed during the delay of the partial subset of the group of fusible instructions. By handling more instructions from a different thread while waiting for the remaining subset of the fusible group, this avoids loss of cycles overall since the 'down time' while stalling handling of instructions for one thread can be used to allow another thread to be processed more quickly.

The instruction fusing stage may be a decode stage of the processing pipeline. Hence, the handling of instructions at the instruction fusing stage may be decoding of the instructions.

The instruction fusing stage may be a dispatch stage of the processing pipeline, and the handling of instructions at this stage may be dispatch of instructions to an issue stage.

The instruction fusing stage may be an issue stage of the processing pipeline, and the handling of instructions at this stage may be issuing of instructions for execution by an execute stage.

One example of a group of instructions for which the present technique is particularly advantageous may be a group of cryptographic instructions. Some cryptographic algorithms include a series of dependent operations and separate instructions may be provided for controlling different steps of the algorithm. As often the entire algorithm may need to be performed, the corresponding cryptographic instructions for each step may often follow soon after one another in code for a given thread and may become available to the instruction fusing stage in relatively close succession. Hence, the present technique is particularly suitable for fusible groups of instructions which comprise a plurality of cryptographic instructions, where it is likely that when one cryptographic instruction of the group is encountered, the others will follow. Examples of the cryptographic process could be AES or SHA.

In other cases, the fusible groups of instructions may comprise other types of instructions, e.g. a plurality of arithmetic or logical instructions.

Figure 1:
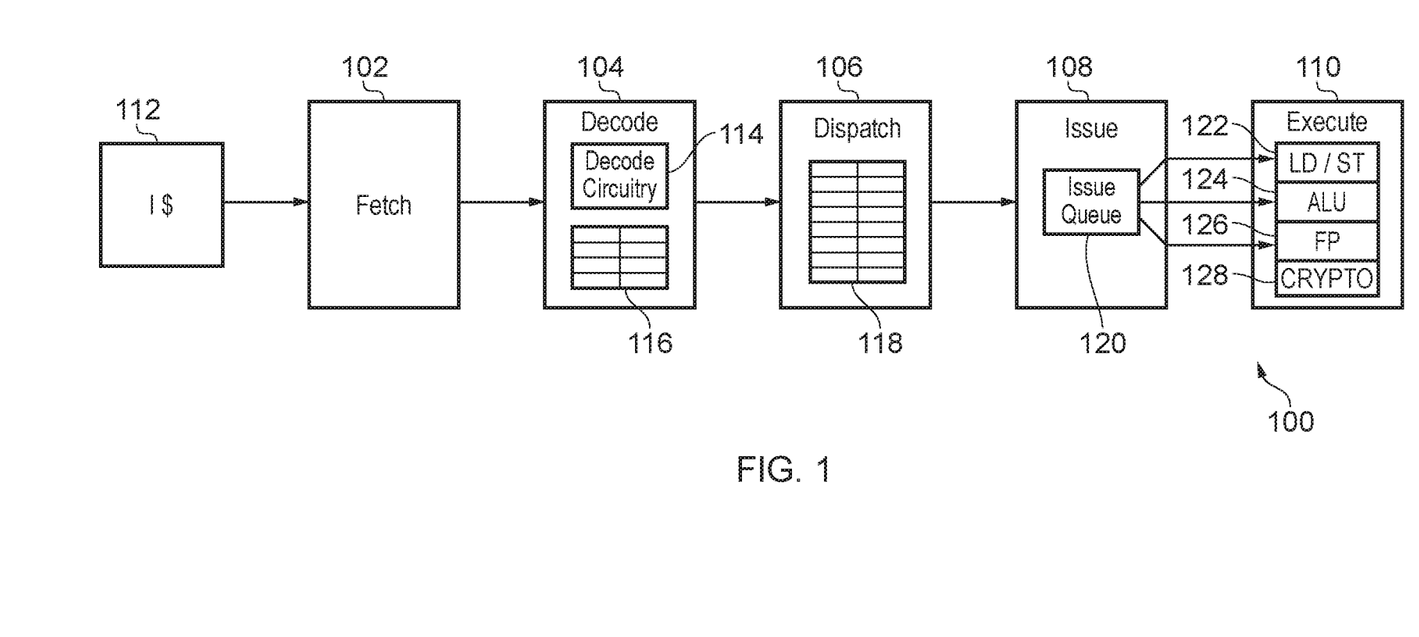
FIG. 1 schematically illustrates one example of a processing pipeline.

FIG. 1 shows an example of a processing pipeline for performing data processing in response to instructions. The pipeline 100 includes a plurality of pipeline stages including a fetch stage 102, a decode stage 104, a dispatch stage 106, an issue stage 108 and an execute stage 110. The fetch stage 102 fetches instructions from an instruction cache 112 which stores instructions. The fetched instructions are then provided to the decode stage 104 which includes decode circuitry 114 for decoding the received instructions, and a decode queue 116 for queuing the instructions to be decoded. The dispatch stage 106 is provided between the decode stage 104 and the issue stage 108 and also includes a dispatch queue 118 for queuing instructions to be dispatched. This allows instructions to leave the decode stage 104 even if there is no available space at the issue stage 108, to prevent stalls in decoding even if there is no spare slot in the issue queue 120 of the issue stage 108. The issue queue 120 queues instructions to be issued for execution while they are awaiting operands to become available from earlier instructions for example. The issue queue 120 issues instructions stored in the issue queue 120 to the execute stage 110 when the operands for the instructions become available. The execute stage 110 includes a number of execute units 122-128 for carrying out different types of processing operations. For example, the execute stage 110 of FIG. 1 includes a load/store unit (LD/ST) 122 for carrying out load and store operations to a data cache or memory, an arithmetic/logic unit (ALU) 124 for performing arithmetic operations such as add, subtract, multiply, or divide or logical operations such as AND, OR or shift operations, and a floating point unit (FP) 126 for performing floating point operations on operands represented in floating point format. Additionally, the execute unit may include a cryptographic unit 128 for performing cryptographic operations.

It will be appreciated that this is just a simplified example of one possible pipeline architecture and that other examples may have different stages. For example some pipelines may omit the dispatch stage or could introduce a register renaming stage for mapping architectural register specifiers specified by instructions to physical register specifiers identifying physical registers provided in hardware. Also, for example the queues in the decode stage 104 and the dispatch stage 106 of this example are dual channel so that in each processing cycle two instructions may be received, handled, and sent for further processing in parallel. However, other pipelines may handle a greater number of instructions per cycle or only a single instruction per cycle, and it is possible for different pipeline stages to handle different numbers of instructions per cycle. Additionally, the execute stage 110 of this pipeline only includes four execute units. However, other execute stages may include different numbers of execute units, or other types of execute units such as a multiple accumulate unit (MAC) for carrying out multiply accumulate operations, or an address generation unit (AGU) for calculating addresses of memory locations to be accessed. Also, in some cases the cryptographic functionality could be combined in a common unit with the ALU 124, FP unit 126 or some other unit.

Figure 2:
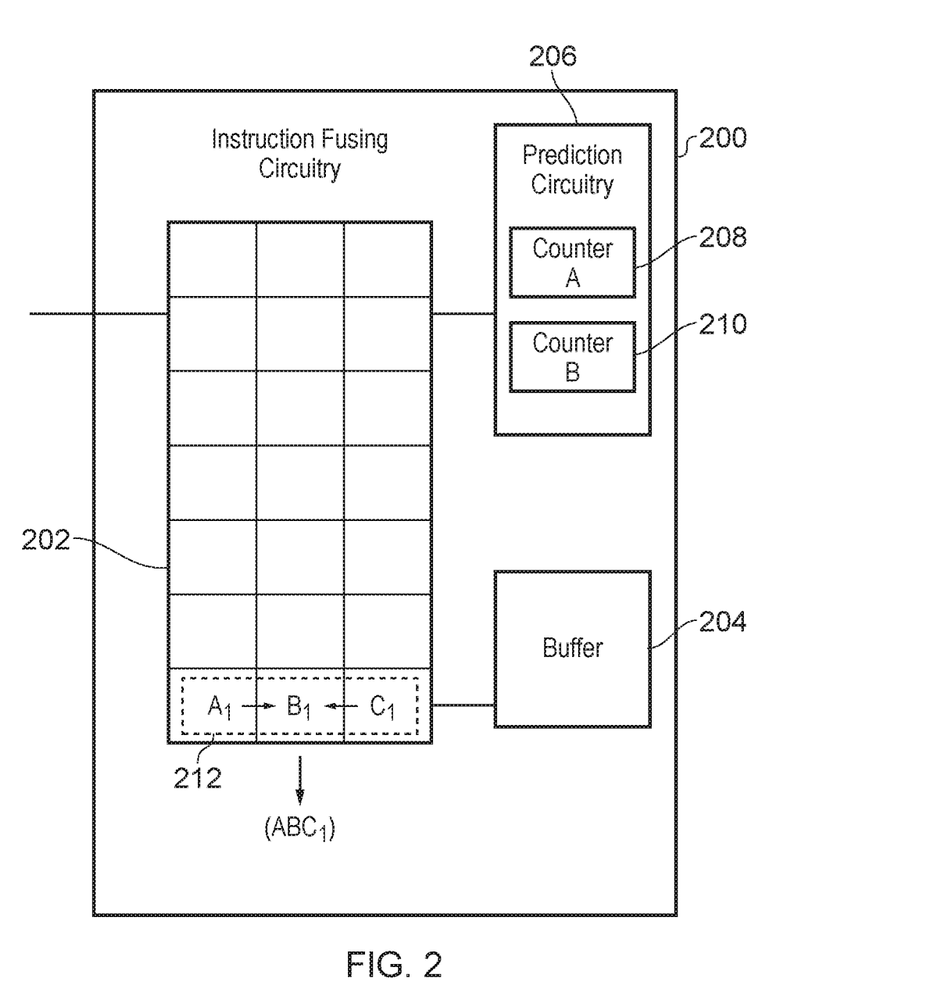
FIG. 2 schematically illustrates one example of instruction fusing circuitry.

FIG. 2 shows one example of an instruction fusing stage 200 which may be any one of the decode stage 104, the dispatch stage 106 and the issue stage 108 of the pipeline 100 shown in FIG. 1. As can be seen from FIG. 2, the instruction fusing stage 200 includes a queue 202 which can queue and handle blocks of instructions of a given size (e.g. three instructions in this example). The queue 202 may be configured as a FIFO such that instructions that have been stored in the queue 202 the longest will be the first to be handled by the instruction fusing stage (e.g. the handling may be decoding, dispatch or issue) and sent for further processing by a subsequent stage. When instructions which form a fusible group 212 are present in the same block of instructions, the instruction fusing stage may fuse them and generate a fused instruction. For example, instructions $A_1$, $B_1$ and $C_1$ are a fusible group of instructions 212, and as they are simultaneously present in the same block of instructions, they may be fused into an instruction $ABC_1$. The fused instruction $ABC_1$ may then be sent for further processing instead of the group of fusible instructions, and typically requires less processing resources than the combination of individual fusible instructions.

Figure 3:
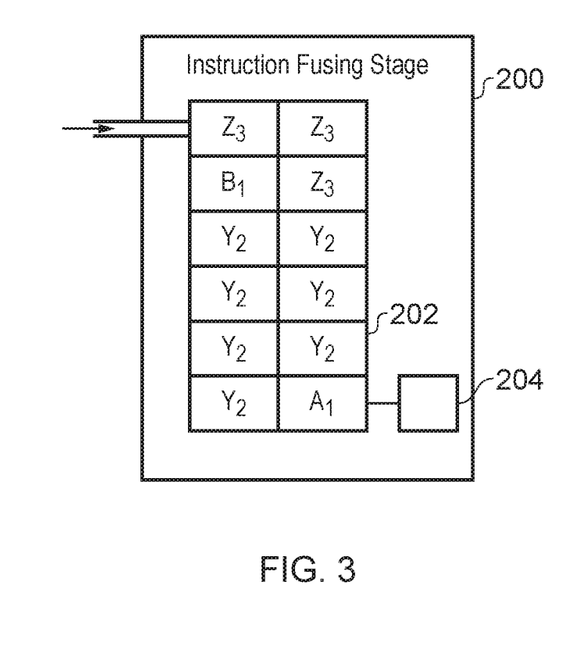
FIG. 3 shows an example of an alignment issue that may occur when a processing pipeline stage is handling multiple threads.

FIG. 3 shows an example of an instruction fusing stage 200 in a processing environment with multiple threads (this time the width of the queue 202 is two instructions). The instruction fusing stage 200 is configured to handle (e.g. decode, dispatch or issue) instructions from three threads: fusible instructions A and B from thread 1, instructions Y from thread 2 and instructions Z from thread 3. In multithreading environments each instruction may have a thread ID, this is indicated in FIG. 3 by the numerical subscripts. While the group of fusible instructions $A_1$ and $B_1$ are suitable candidates to be fused, and may be contiguous in the code of thread 1, due to multi-threading, they may not be contiguous in the instruction stream seen by the instruction fusing stage 200. Therefore, as can be seen in FIG. 3, instructions $A_1$ and $B_1$ become separated by instructions from different threads such as $Y_2$ and $Z_3$. If the instruction fusing stage 200 can only fuse instructions which are within the same block of instructions, then when the situation shown in FIG. 3 occurs, instructions $A_1$ and $B_1$ cannot be fused and the performance benefits of fusion cannot be achieved.

Figure 4:
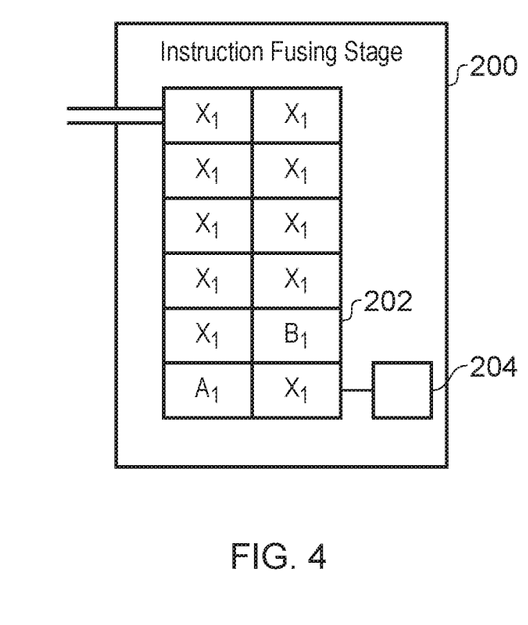
FIG. 4 shows an example an alignment issue that may occur when a processing pipeline stage is handling a single thread.

FIG. 4 shows another example of an instruction fusing stage 200 in a processing environment which is only processing a single thread. However, even though instructions $A_1$ and $B_1$ are contiguous in code, they may still become separated upon entering the queue 202 when the instructions are split into blocks of instructions to be considered over successive cycles by the instruction fusing stage 200. As can be seen from FIG. 4, the first block of instructions includes instructions $X_1$, $A_1$ in the program order, whilst the second block of instructions includes instructions $B_1$, $X_1$ in the program order, so while instructions $A_1$, $B_1$ were consecutive in the original program order they are still not encountered in the same block by the instruction fusing stage 200. Similar to the example shown in FIG. 3, when instructions which form a fusible group such as $A_1$ and $B_1$ are separated into different blocks of instructions, with previous techniques it is also difficult to fuse them and generate a single fused instruction.

Figure 5A:
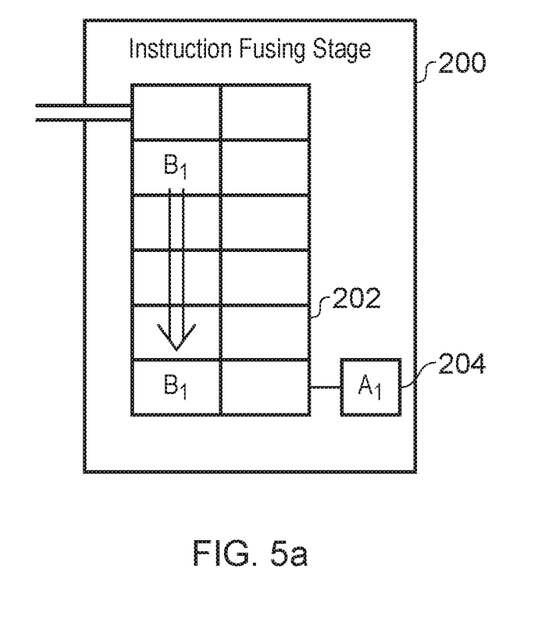
FIGS. 5a and 5b illustrate an example of delaying handling of a partial subset of a fusible group of instructions to allow fusion with a remaining subset of the fusible group.
Figure 5B:
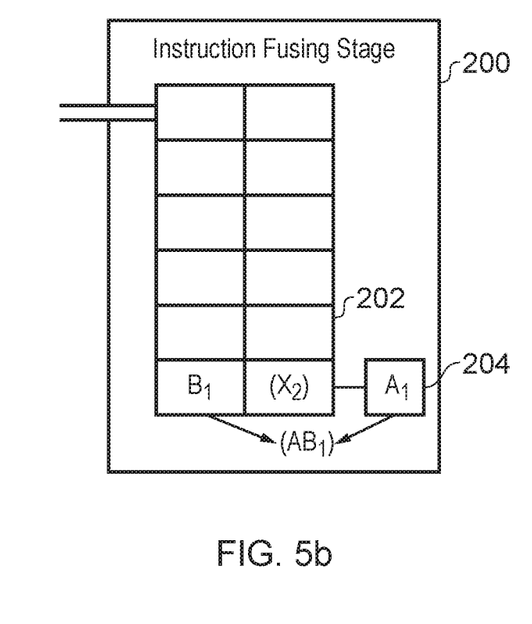

FIGS. 5*a* and 5*b* show an example of how the present technique may be applied to resolve the misalignment of instructions of a fusible group such that a fused instruction may still be generated. As shown in FIG. 5*a*, handling of instruction $A_1$ is delayed by placing $A_1$ in a buffer 204, and continuing handling of the other instructions such as $Y_2$ and $Z_3$, until $B_1$ reaches the front of the queue 202. Once $B_1$ is at the front of the queue 202, $A_1$ can be read from the buffer 204 so that $A_1$ and $B_1$ are available at the same time for fusing together. This allows $A_1$ and $B_1$ to then be fused and instruction $AB_1$ to be generated as shown in FIG. 5*b*. This example is applicable to the multithreading environment shown in FIG. 3. However, it will be appreciated that the present technique could also be applied to the example of FIG. 4 to delay handling of some instructions from a single thread. It will be appreciated that delaying handling of any partial subset of a group of fusible instructions by storing the partial subset in a buffer is only one example of how the delay may be implemented. In other examples, the delayed instruction may remain in the queue while other instructions are handled by the instruction fusing stage.

It will be appreciated that the illustration in the drawings of instructions moving through the queue is schematic and in practice in some embodiments the "front" of the decode queue could be represented by a pointer which cycles around the entries of the queue and so an instruction may remain in the same entry until it is selected for handling by the instruction fusion stage.

Also, it is not essential to provide a queue with multiple entries for queuing instructions received from an earlier stage—in other examples the queue could only comprise one entry, in which case providing a buffer 204 to allow at least one instruction to be delayed can be useful for enabling fusion of instructions split across multiple blocks. In this case, effectively the "block" of instructions considered in each cycle by the instruction fusing stage may comprise the next instruction from the queue 202 and the instruction in the delaying buffer 204, so that instruction fusion can only be performed if an instruction has been delayed from a previous cycle.

The delaying buffer 204 may have a certain finite size, e.g. it may only be able to store one instruction or a few instructions. If the delaying buffer 204 is already full when another partial subset of a fusible group is detected, then either the old partial subset in the buffer 204 or the new partial subset encountered in the queue 202 can be handled and sent for further processing as individual instructions to subsequent stages, without waiting for the remaining subset of that fusible group. In many cases it may be most efficient to give up waiting for the remaining instructions of the fusible group partially stored in the buffer 204, and to proceed with the partial subset based on individual instructions, to make way for the newer partial subset to be stored in the buffer, because the chances of the remaining instructions of the fusible group appearing soon will tend to decrease as the delay becomes longer, and so the likelihood that fusion is possible may be higher for the later encountered partial subset than the older one.

Figure 6A:
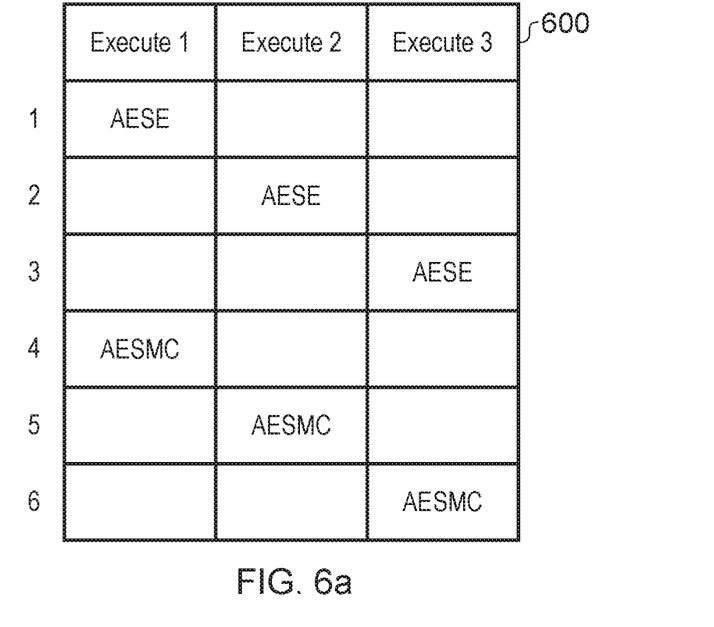
FIGS. 6a to 6c show an example of executing a fused cryptographic instruction instead of individual cryptographic instructions forming the fusible group.
Figure 6B:
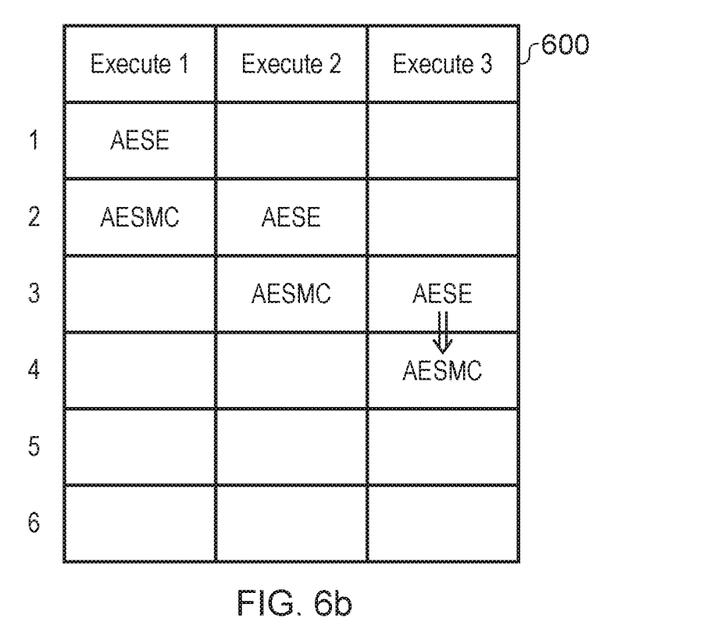
Figure 6C:
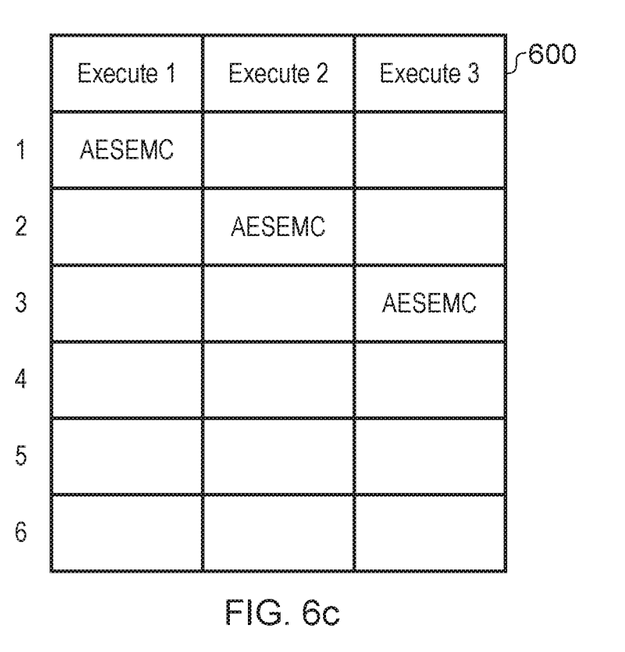

FIGS. 6*a* to 6*c* show an example of why fusing instructions can improve performance. In this example an execute unit 600 has three stages. In this example, the execute unit 600 is executing instructions from the Advanced Encryption Standard (AES) algorithm. Some of the instructions in the instruction set used for AES are the AESE instruction and the AESMC instruction. Since the AESMC (mix columns) instruction is dependent on the outcome of the AESE (sub-bytes) instruction, it can be more efficient to process the pair of instructions as a fused instruction, AESEMC, as processing each instruction individually requires a greater number of processing cycles.

For example, as seen in FIG. 6a, when executing the two instructions separately, the AESE instruction passes through all three stages of the execute unit until the AESMC instruction can begin execution as the AESMC instruction is dependent on the result of AESE. This requires a total of 6 processing cycles. Some execute units can include forwarding circuitry configured to reduce the number of processing cycles. For example, the AESMC instruction may actually only require the third stage of execution, and therefore forwarding circuitry may be provided to forward the result of executing AESE to the third execute stage such that AESMC instruction may be executed in the following cycle (see FIG. 6b). However, this still does not achieve the same level of efficiency provided by fusing the two instructions. For example, as seen in FIG. 6c, the fused instruction AESEMC, which is functionally equivalent to the instructions AESE and AESMC can be executed in three processing cycles.

Figure 7:
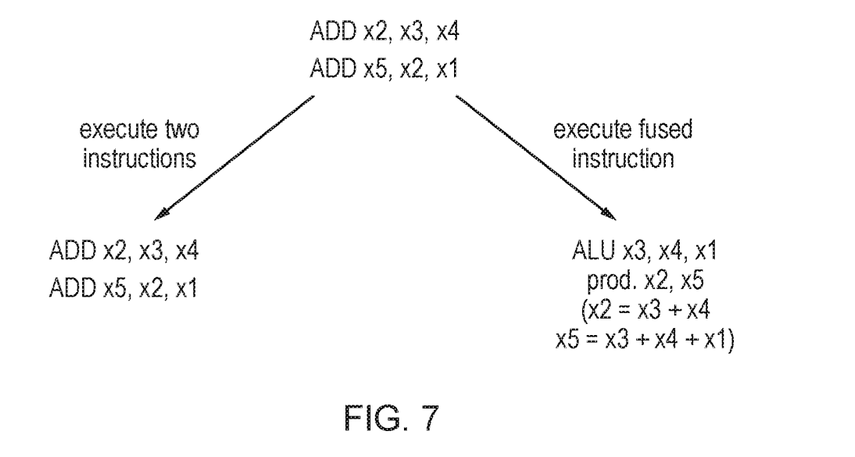
FIG. 7 shows another example of executing a fused arithmetic instruction instead of instructions for performing the equivalent arithmetic operations independently.

FIG. 7 shows another example where a fused instruction can improve efficiency. In the example of FIG. 7, two add instructions, ADD x2, x3, x4 and ADD x5, x2, x1 are received by a processing pipeline. ADD x2, x3, x4 controls the pipeline to add the values in registers x3 and x4 and place the result in register x2, and ADD x5, x2, x1 triggers addition of the values in registers x2 and x1 with the result being written to register x5. As the value stored in register x2 is required for the second add instruction, the second add instruction is dependent on the result of the preceding add instruction. As these instructions are executed as separate operations, this will require a larger number of processing cycles. However, the execute stage of the pipeline may also support execution of a fused instruction that gives the same result, placing the sum of x3+x4 in register x2 and also placing the sum of x3+x4+x1 in register x5. As only a single fused instruction is executed in this case, fewer processing cycles are required to achieve the same result.

Figure 8:
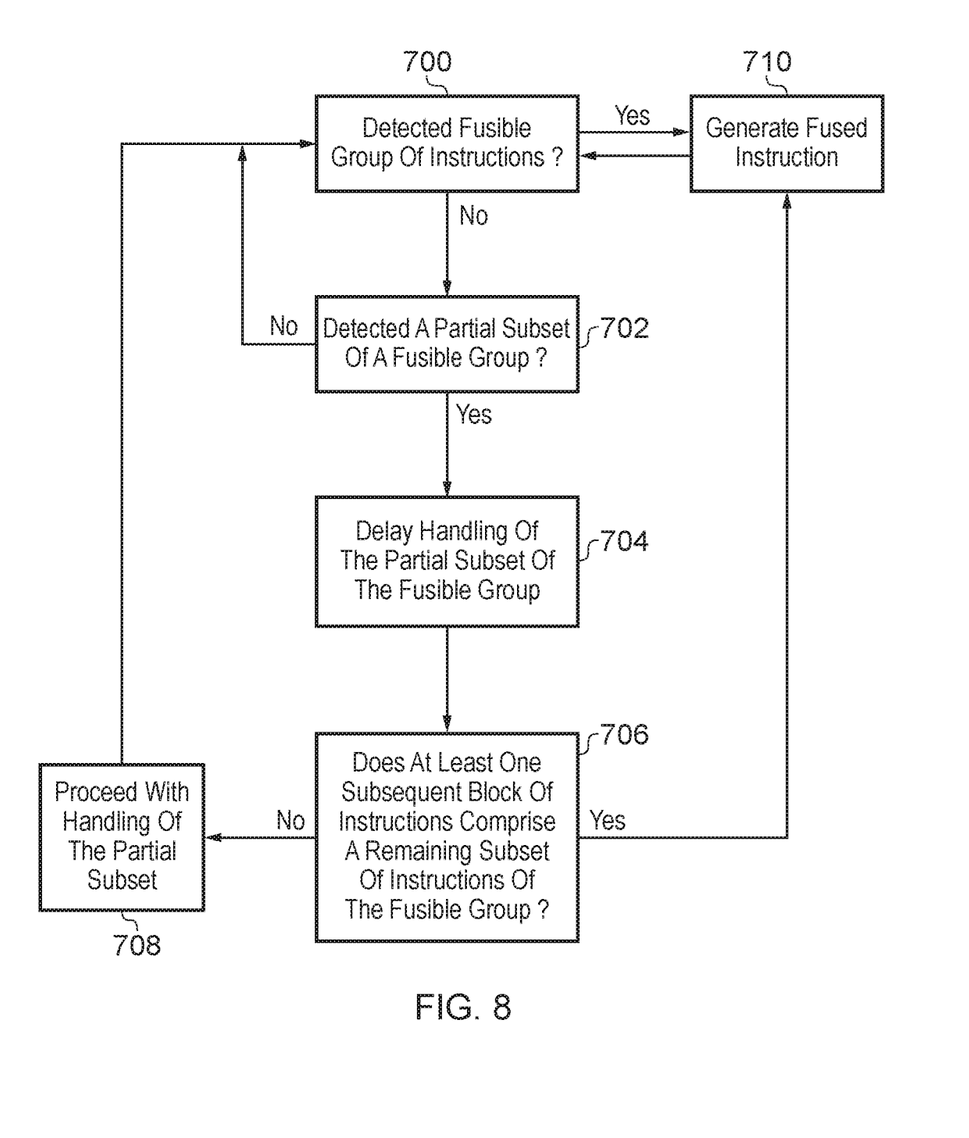
FIG. 8 shows a method for delaying a partial subset of a fusible group of instructions such that it may be fused with a remaining subset.

FIG. 8 illustrates one example of a method for delaying the handling of a partial subset of a fusible group of instructions. In step 700 it is checked whether a fusible group of instructions is detected in a block of instructions considered by the instruction fusing stage. If a fusible group is detected, then the process moves to step 710 where a fused instruction is generated. The process then moves back to step 700 and continues to check whether a fusible group of instruction is detected. If a fusible group is not detected, the process moves to step 702 where it is checked whether a partial subset of a fusible group is detected. In the event that a partial subset of a fusible group is detected, handling of the partial subset is delayed in step 704. The process then proceeds to step 706 where it is determined whether at least one subsequent block of instructions comprises a remaining subset of instructions of the fusible group. If the remaining subset is not detected, then the process moves to step 708, and proceeds with handling of the partial subset of instructions. However, if at least one subsequent block of instructions does comprise a remaining subset of the instructions of the fusible group, then the process generates a fused instruction in step 710. The process then returns to cycling between steps 700 and 702 until either another fusible group of instructions, or a partial subset of a fusible group is detected.

Figure 9:
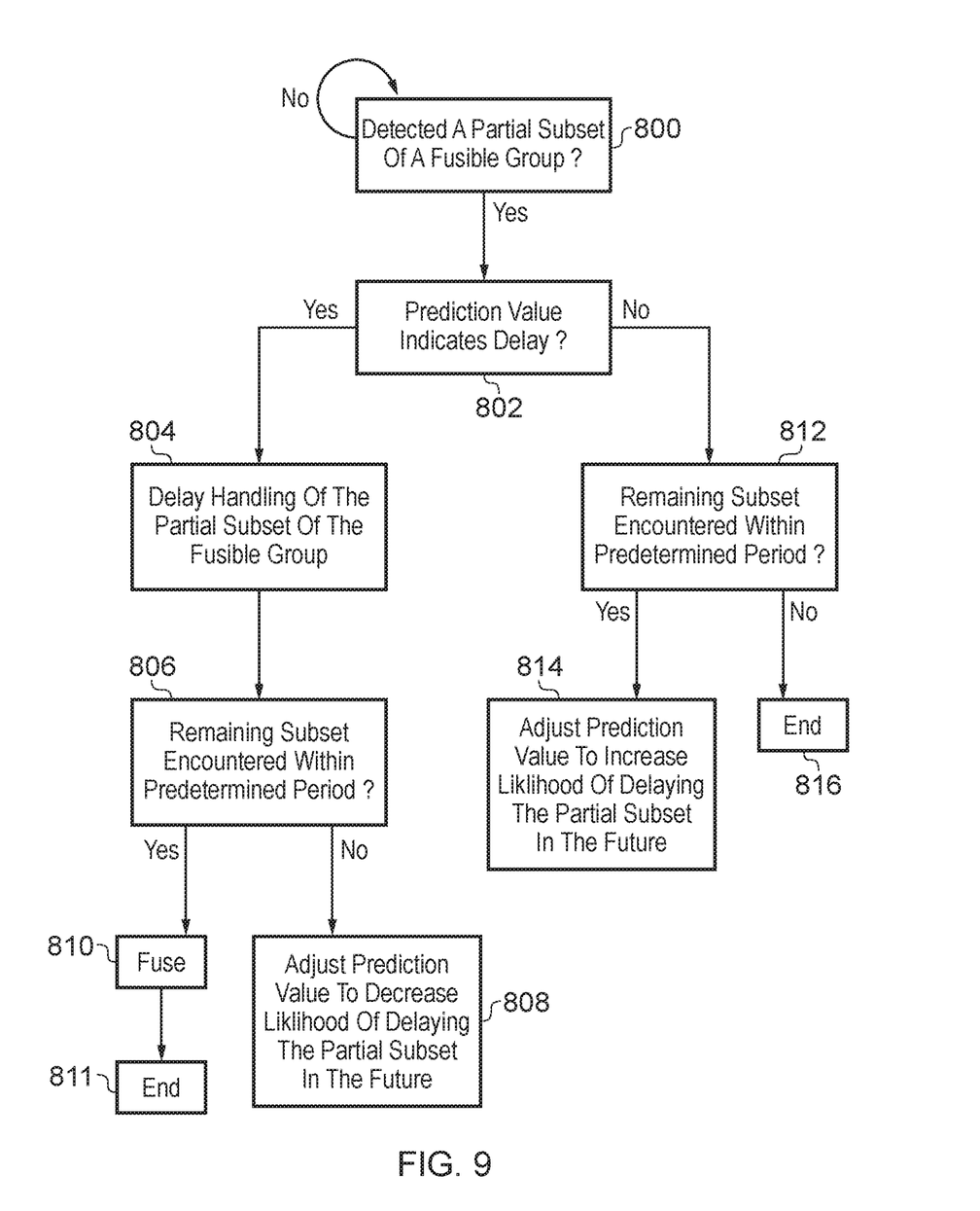
FIG. 9 shows a method for determining whether to delay a partial subset based on prediction circuitry.

FIG. 9 illustrates a method for predicting whether it is worth delaying handling of a partial subset of instructions from a fusible group to allow potential fusion with a subsequent group. In step 800 it is checked whether a partial subset of a fusible group is detected. If not, the method returns to step 800 until a partial subset of a fusible group is detected. When a partial subset of a fusible group is detected, then in step 802 it is checked whether a prediction value for the partial subset of the fusible group indicates that a delay is appropriate. This may be performed, for example, by comparing the prediction value (e.g. a counter value) against a threshold value. If the prediction value indicates that a delay is appropriate, then handling of the partial subset of the fusible group is delayed in step 804. In step 806, it is checked whether the remaining subset is encountered within a predetermined period (the period could be a certain time period or could expire when a given number of subsequent blocks of instructions have been encountered). When the remaining subset is encountered, the prediction was successful, and the fused instruction is generated in step 810 and the process ends at step 811. However, if the remaining subset is not encountered within the predetermined period, then in step 808 the prediction value is adjusted to decrease the likelihood of delaying the partial subset in the future (e.g. the counter can be decremented).

This process also works when the prediction value indicates that a delay is not appropriate in step 802, and hence the partial subset of a fusible group is sent for further handling. However, the process may still monitor incoming instructions, and if it is detected that the remaining subset is encountered within the predetermined period, and that it would have actually been beneficial to delay the partial subset in step 812, then the process may also adjust the prediction in step 814 to increase a likelihood of delaying the partial subset in future (e.g. the count value may be incremented). However, if the remaining subset is not encountered within the predetermined period, then the process ends at step 816.

One example of prediction circuitry 206 configured to perform the method of FIG. 9 is shown in FIG. 2. As can be seen from FIG. 2, the prediction circuitry 206 comprises two counters, counter A 208 for monitoring a first group of fusible instructions, and counter B 210 for monitoring a second group of fusible instructions. Each counter may also be compared to its own threshold value. By performing the method FIG. 9 on each of counter A 208 and counter B 210 it can be determined whether to delay partial subsets of two groups of fusible instructions. However, it will be appreciated that any number of counters may be included in the prediction circuitry for monitoring any number of groups of fusible instructions.

It is also possible to replace end step 811 with step 814 (i.e. step 814 would be performed both following step 810 and following step 812 in the "Yes" case), and replace end step 816 with step 808 (i.e. step 808 would follow both steps 806 and 812 in the "No" case). In this way, when the process makes a correct prediction, this is also reflected in the prediction value to reinforce the prediction to make it more likely to be repeated again when it has been correct.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
   a processing pipeline comprising a plurality of stages;
      the plurality of stages comprising at least one instruction fusing stage to detect whether a block of instructions to be processed comprises one of a plurality of fusible groups of instructions, and to generate a fused instruction to be processed by a subsequent stage of the processing pipeline when said block of instructions comprises said one of said plurality of fusible groups of instructions, each fusible group of instructions comprising a dependent instruction which is dependent on an outcome of an earlier instruction of the fusible group, where the earlier instruction and the dependent instruction are fusible to generate the fused instruction; wherein
      said plurality of fusible groups of instructions comprising a first fusible group of instructions and a second fusible group of instructions, the first and second fusible groups of instructions corresponding to different fused instructions;
      when said block of instructions comprises a partial subset of said first fusible group of instructions, said at least one instruction fusing stage is configured to delay handling of said partial subset of said first fusible group of instructions until said at least one instruction fusing stage has determined whether at least one subsequent block of instructions to be processed comprises a remaining subset of instructions of said first fusible group of instructions; and
      when said block of instructions comprises a partial subset of said second fusible group of instructions, said at least one instruction fusing stage is configured to omit said delay, and to send said partial subset of said second fusible group of instructions for handling by said subsequent stage of the processing pipeline without waiting to determine whether at least one subsequent block of instructions includes a remaining subset of instructions of said second fusible group of instructions; and
      when said block of instructions comprises all instructions of said second fusible group of instructions, said at least one instruction fusing stage is configured to omit said delay and to fuse said second fusible group of instructions.

2. The apparatus according to claim 1, wherein in response to determining that said at least one subsequent block of instructions to be processed comprises the remaining subset of instructions of said first fusible group of instructions, said at least one instruction fusing stage is configured to generate the fused instruction to be processed by said subsequent stage of the processing pipeline.

3. The apparatus according to claim 1, wherein said at least one instruction fusing stage is configured to control said subsequent stage of said processing pipeline to process said partial subset of said first fusible group of instructions when a predetermined period elapses before detecting a subsequent block of instructions comprising said remaining subset of instructions of said first fusible group of instructions.

4. The apparatus according to claim 3, wherein said predetermined period elapses after handling of a predetermined number of subsequent blocks of instructions by said at least one instruction fusing stage.

5. The apparatus according to claim 3, wherein said predetermined period elapses following a predetermined amount of time after detecting said partial subset of said first fusible group of instructions.

6. The apparatus according to claim 1, wherein said at least one instruction fusing stage is configured to select whether to delay handling of the partial subset of said first fusible group of instructions based on monitoring of previous instances of processing the partial subset of said first fusible group of instructions.

7. The apparatus according to claim 6, wherein said at least one instruction fusing stage is configured to select whether to delay handling of the partial subset of the first fusible group of instructions based on first monitoring data determined based on monitoring of previous instances of processing the partial subset of said first fusible group of instructions; and
   said at least one instruction fusing stage is configured to select whether to delay handling of the partial subset of a third fusible group of instructions based on second monitoring data determined based on monitoring of previous instances of processing the partial subset of said first fusible group of instructions.

8. The apparatus according to claim 1, wherein the fused instruction is functionally equivalent to said one of said plurality of fusible groups of instructions.

9. The apparatus according to claim 1, wherein processing of said one of said plurality of fusible groups of instructions requires a greater number of processing cycles than processing of said fused instruction.

10. The apparatus according to claim 1, wherein said at least one instruction fusing stage comprises a decode stage of said processing pipeline, and said handling of said partial subset of said first fusible group of instructions comprises supplying decoded instructions corresponding to said partial subset of said fusible group of instructions to said subsequent stage of the processing pipeline.

11. The apparatus according to claim 1, wherein said at least one instruction fusing stage comprises a dispatch stage of said processing pipeline, and said handling of said partial subset of said fusible group of instructions comprises dispatching said partial subset of said first fusible group of instructions to an issue stage of said processing pipeline.

12. The apparatus according to claim 1, wherein said at least one instruction fusing stage comprises an issue stage of said processing pipeline, and said handling of said partial subset of said first fusible group of instructions comprises issuing said partial subset of said first fusible group of instructions for execution.

13. The apparatus according to claim 1, wherein said first fusible group of instructions comprises a plurality of cryptographic instructions for triggering the processing pipeline to perform respective stages of a cryptographic process.

14. The apparatus according to claim 1, wherein said first fusible group of instructions comprises a plurality of arithmetic or logical instructions.

15. An apparatus comprising:
   a processing pipeline comprising a plurality of stages;
   the plurality of stages comprising at least one instruction fusing stage to detect whether a block of instructions to be processed comprises one of a plurality of fusible groups of instructions, and to generate a fused instruction to be processed by a subsequent stage of the processing pipeline when said block of instructions comprises said one of said plurality of fusible groups of instructions; wherein said plurality of fusible groups of instructions comprising a first fusible group of instructions and a second fusible group of instructions;

when said block of instructions comprises a partial subset of said first fusible group of instructions, said at least one instruction fusing stage is configured to delay handling of said partial subset of said first fusible group of instructions until said at least one instruction fusing stage has determined whether at least one subsequent block of instructions to be processed comprises a remaining subset of instructions of said first fusible group of instructions; and when said block of instructions comprises a partial subset of said second fusible group of instructions, said at least one instruction fusing stage is configured to omit said delay;

wherein said at least one instruction fusing stage is configured to select whether to delay handling of the partial subset of said first fusible group of instructions based on monitoring of previous instances of processing the partial subset of said first fusible group of instructions;

when said block of instructions comprising said partial subset of said first fusible group of instructions is followed by a subsequent block of instructions comprising said remaining subset of said first fusible group of instructions within a predetermined period, said at least one instruction fusing stage is configured to increment a counter, and said at least one instruction fusing stage is configured to select whether to delay handling of said partial subset of said first fusible group of instructions based on a comparison of a value of said counter and a threshold value.

16. The apparatus according to claim 15, wherein when said predetermined period elapses before detecting a subsequent block of instructions comprising said remaining subset of instructions of said first fusible group of instructions, said at least one instruction fusing stage is configured to decrement said counter or reset said counter to an initial value.

17. A method for processing data in a processing pipeline comprising a plurality of stages, comprising:

detecting at an instruction fusing stage of the processing pipeline whether a block of instructions to be processed comprises one of a plurality of fusible groups of instructions, and generating a fused instruction to be processed by a subsequent stage of the processing pipeline when said block of instructions comprises said one of said plurality of fusible groups of instructions, each fusible group of instructions comprising a dependent instruction which is dependent on an outcome of an earlier instruction of the fusible group, where the earlier instruction and the dependent instruction are fusible to generate the fused instruction;

said plurality of fusible groups of instructions comprising a first fusible group of instructions and a second fusible group of instructions, the first and second fusible groups of instructions corresponding to different fused instructions;

when said block of instructions comprises a partial subset of said first fusible group of instructions, delaying handling of said partial subset of said first fusible group of instructions at said at least one instruction fusing stage until it is determined whether at least one subsequent block of instructions to be processed comprises a remaining subset of instructions of said first fusible group of instructions;

when said block of instructions comprises a partial subset of said second fusible group of instructions, omitting said delaying, and sending said partial subset of said second fusible group of instructions for handling by said subsequent stage of the processing pipeline without waiting to determine whether at least one subsequent block of instructions includes a remaining subset of instructions of said second fusible group of instructions; and when said block of instructions comprises all instructions of said second fusible group of instructions, omitting said delaying and fusing said second fusible group of instructions.

18. The apparatus according to claim 1, wherein while handling of said partial subset of said first fusible group of instructions is delayed, said at least one instruction fusing stage is configured to handle at least one instruction from a different thread to said partial subset of said first fusible group of instructions, with said at least one instruction from a different thread handled as a non-fused instruction separate from said partial subset of said first fusible group of instructions.

* * * * *